(No Model.)

A. W. ALLEN.
FENDER.

No. 462,188. Patented Oct. 27, 1891.

Witnesses
Albert Speiden.
Van Buren Hillyard.

Inventor
Alexander W. Allen.
By his Attorneys
R. S. & A. P. Lacey

UNITED STATES PATENT OFFICE.

ALEXANDER W. ALLEN, OF TEMPLE, GEORGIA.

FENDER.

SPECIFICATION forming part of Letters Patent No. 462,188, dated October 27, 1891.

Application filed June 26, 1891. Serial No. 397,641. (No model.)

*To all whom it may concern:*

Be it known that I, ALEXANDER W. ALLEN, a citizen of the United States, residing at Temple, in the county of Carroll and State of Georgia, have invented certain new and useful Improvements in Fenders; and I do hereby declare the following to be a full, clear, and exact description of the invention, such as will enable others skilled in the art to which it appertains to make and use the same.

This invention relates to fenders for cultivating-plows, and aims to provide a simple device for the purpose which will be efficient and convenient of attachment to the beam of an ordinary plow.

The improvement consists of the novel features and the peculiar construction and combination of the parts which will be hereinafter more fully described and claimed, and which are shown in the annexed drawings, in which—

Figure 1:
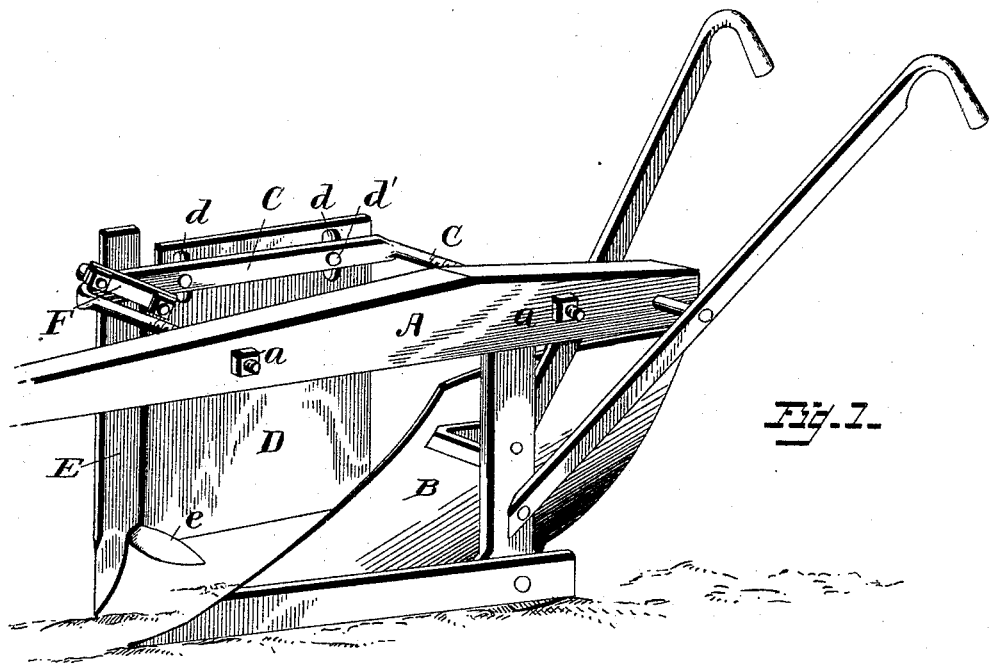
Figure 2:
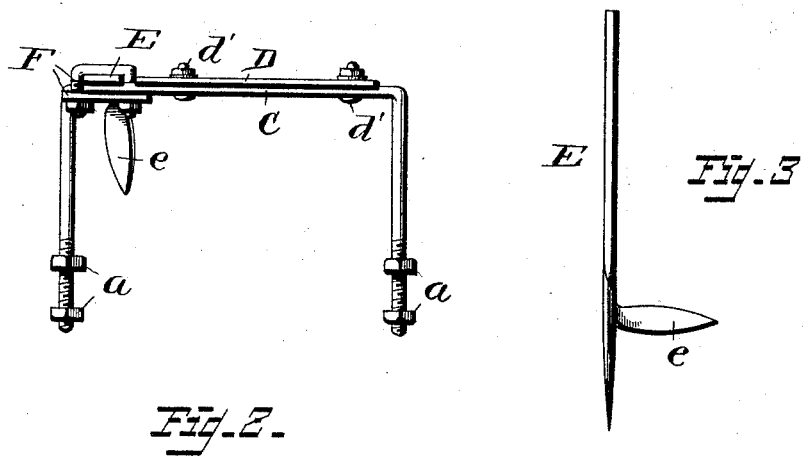
Figure 3:
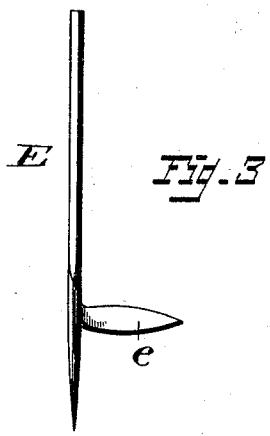

Figure 1 is a perspective view of the invention, showing it applied to a plow of well-known construction. Fig. 2 is a top plan view of the fender and its attachments detached from the plow. Fig. 3 is a front view of the colter.

The plow is of usual construction and arrangement, comprising the beam A and the plow B. The fender supporting-frame C is an approximately U-shaped frame having its parallel end portions threaded and inserted through suitable openings in the beam A. A pair of burrs $a$ is mounted on each threaded portion of the frame C, one burr on each side of the beam. By a proper adjustment of these burrs the frame C is adjustably connected with the beam and the fender is brought nearer to or carried farther away from the plow. When the frame C is in the desired position, it is fastened by screwing up the burrs tight against the sides of the beam.

The fender D is a board of suitable length and width and is adjustably connected with the frame C by bolts $d'$, which pass through vertical slots $d$ in the said fender. The colter E is located in advance of the fender, and is held to the frame C by clip F, and is wide and narrow and arranged close to the fender to form a part thereof. The lower end of the colter is sharpened and projects below the lower edge of the fender to enter the ground and steady the plow and prevent side draft. The blade $e$, projected laterally from the colter about in the plane of the lower edge of the fender, inclines upwardly from the front to the rear edge and is designed to cut down grass, weeds, &c. By loosening the clip F the colter can be raised and lowered.

The fender and the colter have independent vertical adjustment, whereby their relative position can be changed to suit the nature of the soil.

Having thus described my invention, what I claim, and desire to secure by Letters Patent, is—

1. The combination, with a plow-beam, of the fender-supporting frame adjustably connected with the said beam, and the colter and the fender mounted upon and having independent vertical adjustment connection with the outer closed end of the said frame, substantially as set forth, the colter and the fender being in the same straight line, substantially as shown, for the purpose specified.

2. The combination, with a plow-beam, and the frame C, connected with the said beam, of the fender and the colter arranged close together and having independent vertical adjustment connection with the said frame, substantially as described.

In testimony whereof I affix my signature in presence of two witnesses.

ALEXANDER W. ALLEN.

Witnesses:
OSCAR BRYANT,
WILLIAM L. KINNEY.